United States Patent Office 3,302,978
Patented Feb. 7, 1967

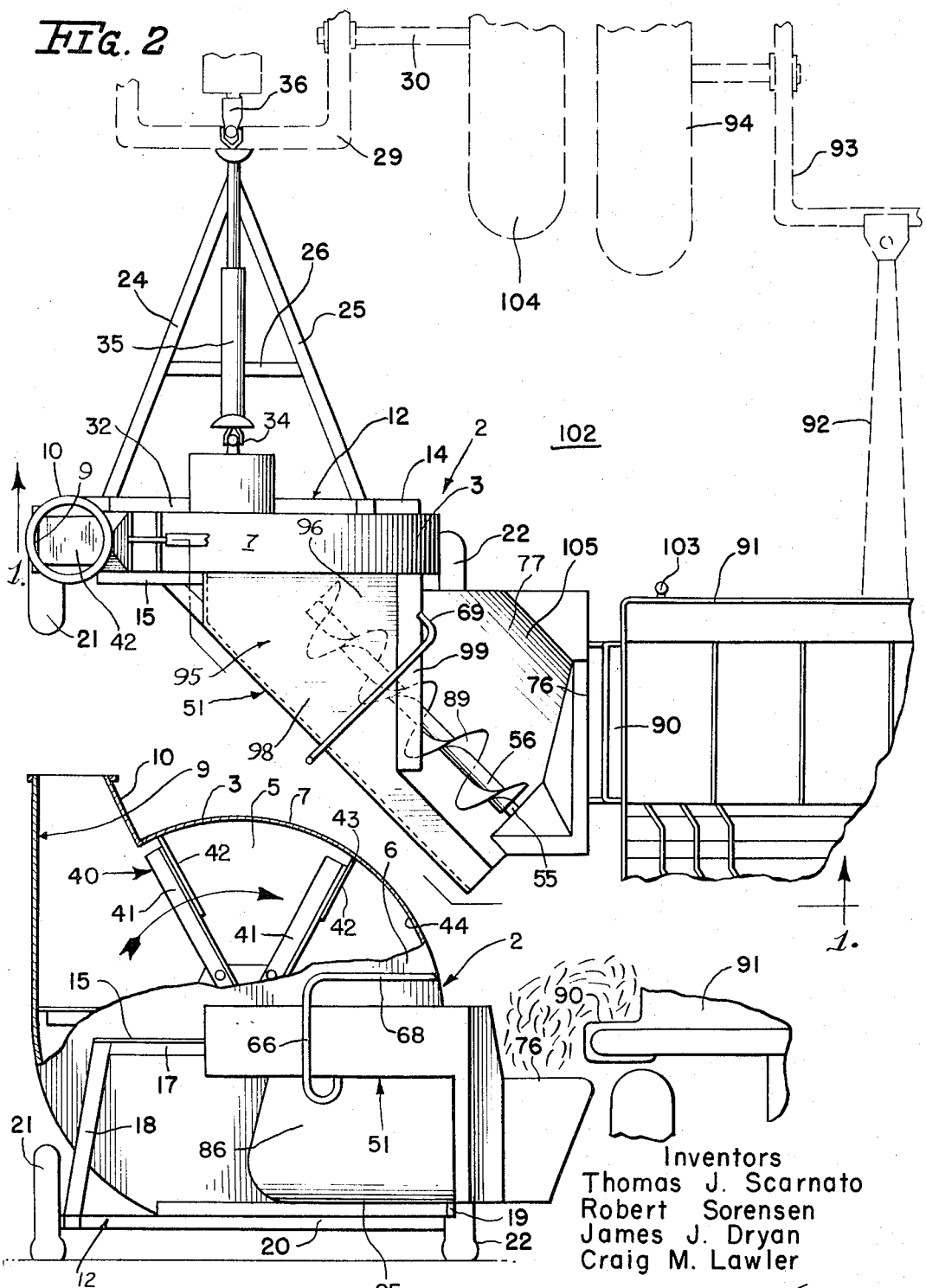

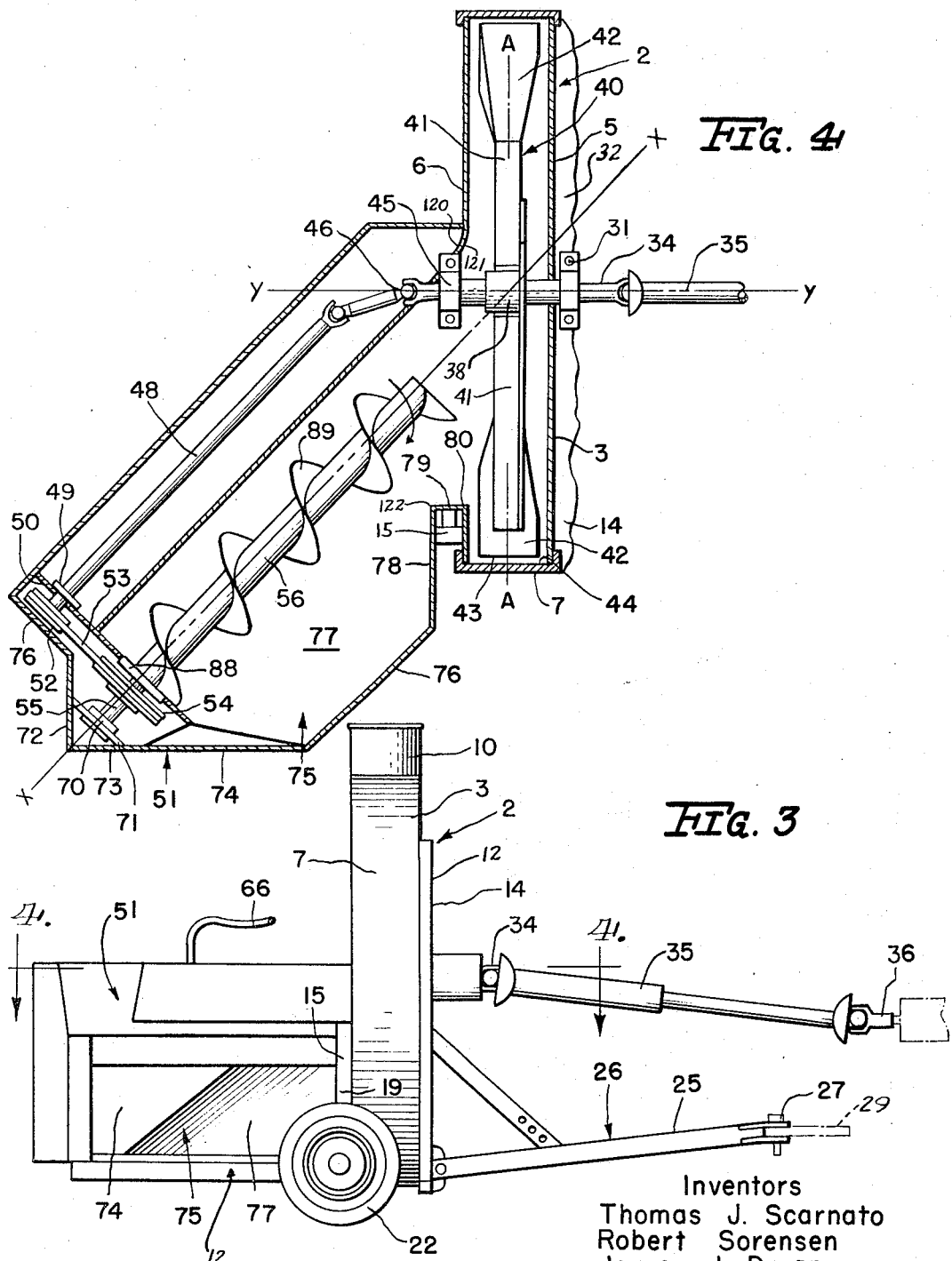

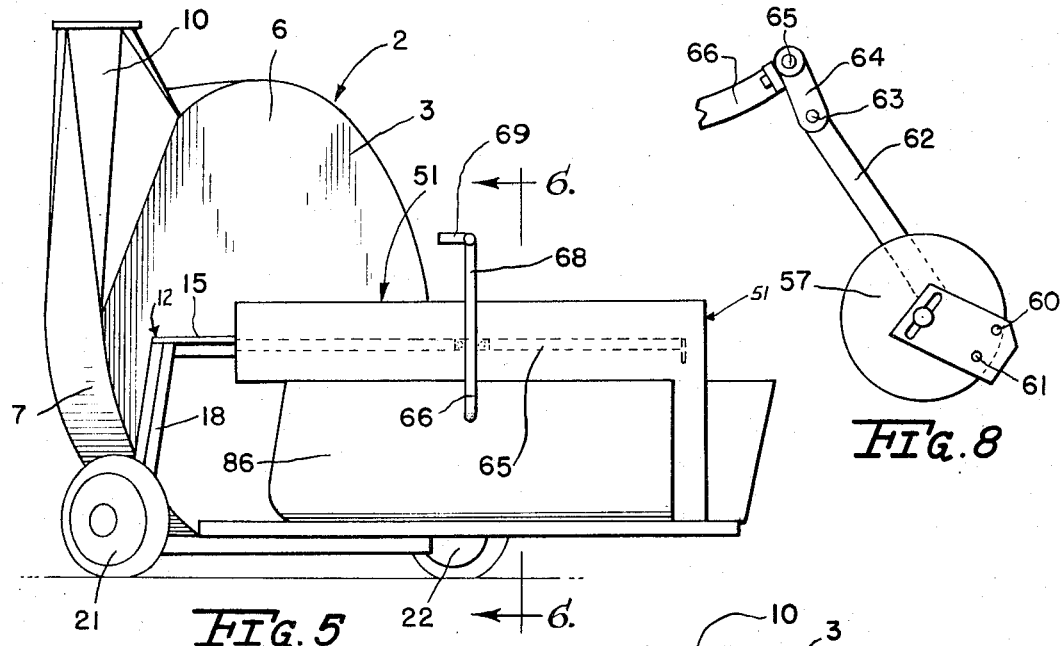
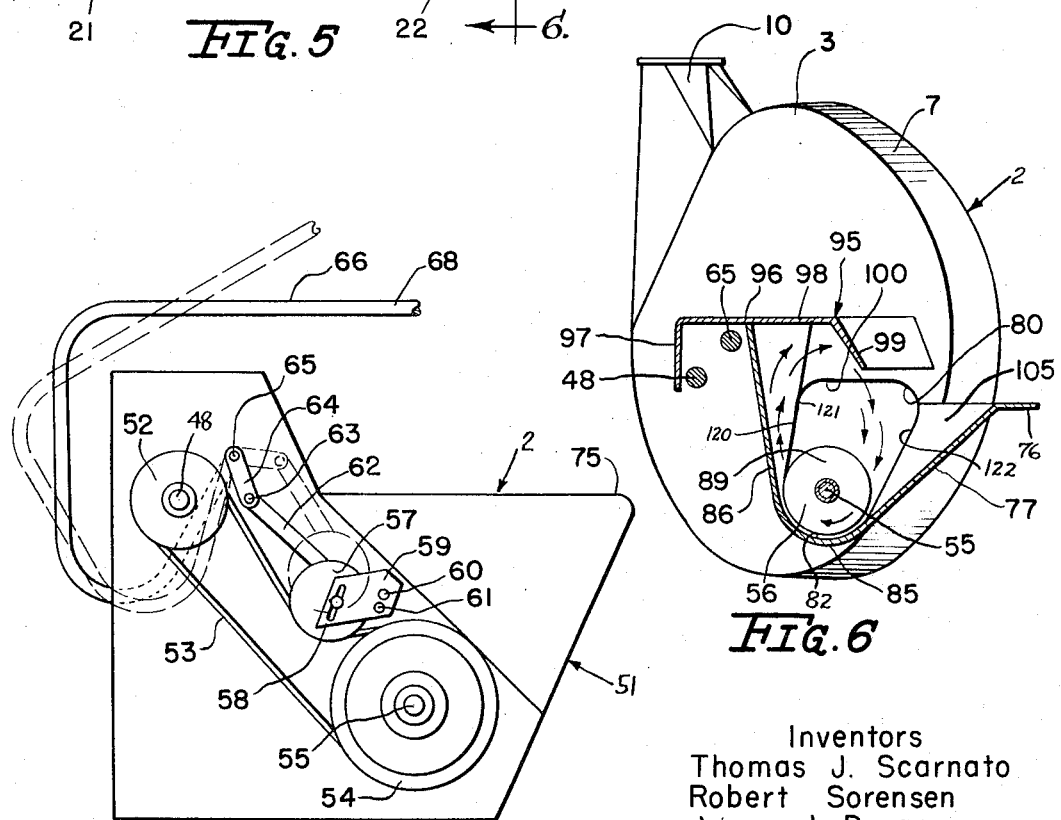

3,302,978
DIAGONAL FEED MATERIAL CONVEYOR AND BLOWER MECHANISM
Thomas J. Scarnato, Park Ridge, Robert Sorensen and James J. Dryan, Chicago, and Craig M. Lawler, Downers Grove, Ill., assignors to International Harvester Company, Chicago, Ill., a corporation of Delaware
Filed May 28, 1965, Ser. No. 459,852
14 Claims. (Cl. 302—37)

This invention relates to material conveyors and more specifically to the type incorporating a blower for mechanically and pneumatically conveying material entrained in the air stream.

The blower is exemplified in the mechanism for blowing forage crops although it will be understood that in its broad aspects it may have application to other uses.

In forage blowers particularly, the blower mechanism comprises a fan which is encased within a housing, the fan normally rotating about a substantially horizontal axis and having a series of radially extending paddles which are adapted to engage the material which is being fed into the housing either through the side of the housing or through the periphery of the housing and to discharge the material through a tangential upwardly directed opening. In forage blowers the upwardly directed opening is formed as a duct which connects to suitable piping adapted to be positioned along side a silo to discharge forage crops into the upper end of the silo as is well known to those skilled in the art. Conventional forage blowers incorporate a feed trough which is directed to discharge a stream of material through a side of an upright housing parallel to the axis of rotation of the blower fan whereby the material is caused to enter into the fan at right angles to the direction of rotation of the fan so that the material must change its direction of movement at right angles. This is accomplished by the paddles or the fan blades striking the material and carrying it circumferentially of the housing to the discharge opening. We have found that this transition in the direction of movement of the material in being so abrupt greatly increases the power requirements of the mechanism. Furthermore for a given size of rotor in the type of forage blowers heretofore used in feeding the material at right angles to the direction of movement to the fan taxes the capability of the mechanism to an extent such that it operates far below its maximum capacity.

In the right angle feed to the blower the inertia of the material as it is exiting into the blower rotor must be overcome. Then the material must be given an impetus in a direction normal to its initial velocity. Increasing the size of the rotor and of the conveyor delivering to the rotor greatly compounds the problems. Feeding of the material through the periphery also poses problems in that the intake of the material is partially opposed by air blasts which are directed by the blades of the rotor toward the inlet opening.

A further problem inherent in material blowing mechanisms of current design is in the complications arising from the construction of the conveying mechanism which delivers the material into the blower rotor. This conveying mechanism must be arranged to move the material initially transversely and then direct such material in a direction perpendicular to the plane of rotation of the blower rotor. This arrangement of conveying of the material is occasioned by current farming practices which utilize a forage box or wagon which discharges from the side of the box. Forage blowers normally are mounted behind a tractor and an operator with a loaded wagon pulls up alongside the tractor which drives the blower and jockeys the wagon so as to get its discharge mechanism aligned with the conveyor of the blower. This is not only time consuming and tedious but frequently is almost impossible to accomplish depending on the terrain locations, etc. of the setup. Furthermore, the transition mechanism for moving the crop material from the forage box to the blower conveyor usually requires several active or powered mechanism which not only complicates the structures but adds to its cost. Frequently this mechanism must be supplemented by hand raking.

A general object of the invention is to provide a novel material blowing mechanism which incorporates a rotor blower and where the conveying air to the blower is so arranged so as to optimize delivery of material thereto.

A further object of the invention is to provide a material blower which incorporates a blower rotor rotatable about a substantially horizontal axis and a conveyor arranged to deliver to the blower from a side thereof with a stream of material entering the rotor diagonally thereto in the direction of rotation of the rotor.

A further object of the invention is to provide a novel material blower mechanism wherein the delivery of the material into the rotor and the structure of the inlet opening into the rotor housing is so designed as to fluff and aerate the material in order to obtain an efficient entrainment of the material into the airstream to effect efficient propulsion thereof.

More specifically the invention contemplates provision of a blower rotor rotatable about a substantially horizontal axis within an upright housing having an upwardly directed peripheral discharge opening and an inlet opening through the side of the housing and wherein the conveyor is disposed substantially at 45° to the plane of the rotor so that the acceleration of the material by the conveyor augments the action of the rotor in discharging the material from the blower housing.

More specifically the invention contemplates arranging the conveyor with the blower in such a way that the momentum of the material as it is discharging into the blower is utilized to propel it through the blower.

These and other objects and advantages inherent and encompassed by the invention become more readily apparent from the specification and the drawings, wherein:

FIGURE 1 is a rear elevational view of the novel blower partly in section taken substantially on the line 1—1 of FIGURE 2, a fragmentary rear elevation of a wagon discharging into the blower being shown.

FIGURE 2 is a plan view of the novel material blower fragmentarily illustrating the invention in connection with a tractor and in association with a forage discharge tractor trailer wagon combination.

FIGURE 3 is a side elevation view of the right side of the novel blower.

FIGURE 4 is a horizontal cross sectional view taken substantially on line 4—4, FIGURE 3 on a larger scale.

FIGURE 5 is a side elevation view of the left side of the novel blower.

FIGURE 6 is a cross sectional view taken substantially on line 6—6 of FIGURE 5.

FIGURE 7 is a rear end view of the blower with certain shielding removed, and

FIGURE 8 is an enlarged side elevational view of the clutch operating linkage.

*Description of the invention*

In the drawings there is shown a forage or material blower generally designated 2 which comprises a generally cylindrical blower housing indicated at 3 which has a pair of vertical axially spaced substantially radial sidewalls 5 and 6 and a peripheral wall 7 which is provided with an outlet opening 9 (FIG. 1) extending substantially tangentially with respect to the peripheral wall 7 and communicating with an upwardly directed duct or piping 10.

The casing or housing 3 is connected to a framework generally designated 12 which includes front and rear frame sidings 14 and 15 embracing the casing 3 therebetween and integrated suitably either by bolting or welding with the respective sidewalls 5 and 6.

The inverted U-shaped frame 15 comprises a top frame member 17 (FIG. 1) and a pair of laterally spaced leg members 18 and 19 which at their lower ends are connected by a substantially horizontal axle beam 20 the opposite ends of which are provided with suitable spindles mounting support wheels 21, 22.

The frame structure 14 is integrally connected to the forwardly converging side beam members 24, 25 of the A-shaped draft frame 26, said beam members 24, 25 being suitably connected at their rear ends as by welding or bolting to the frame structure 14 and at their forward ends being provided or connected to a suitable draft clevis 27 which may be connected in any suitable way as by a pin to the draft frame or drawbar 29 which is mounted on an associated motivating and propelling unit such as a tractor diagrammatically fragmentarily illustrated at 30 in FIGURE 2.

The frame structure 14 also supports a bearing assembly 31 (FIG. 4) adjacent to the wall 3 on the beam member 32. The bearing structure 31 supports a shaft 34 which is suitably connected through a universally jointed power shaft 35 to the power-take-off shaft 36 which is normally positioned at the rear end of the tractor 30. It will be understood that the input of power to the blower conveyor unit may be from any source.

The shaft 34 is connected to the hub 38 of an impeller or rotor generally designated 40 said impeller comprising a plurality of radial arms 41 (FIG. 4) each of which carries a paddle 42 at its outer extremity. Each paddle extends widthwise axially of the rotor and has its outer edge 43 spaced radially inwardly slightly from the internal periphery 44 of the peripheral casing wall 7. The rotor 40 is rotated in the direction shown by the arrow in FIGURE 1 and rotates about a substantially horizontal axis as defined by the shaft 34 which is supported from the wall 6 and associated framework 15 by a bearing 45 (FIG. 4). The shaft 34 projects beyond the rear side of the casing 3 and is connected by means of universally jointed shafting 46 to a shaft 48 which extends horizontally diagonally with respect to the axis of the shaft 34. The shaft 48 is journalled at its rear end in a bearing 49 which is mounted on an upright wall 50 at the rear end of a conveyor trough structure generally designated 51. The shaft 48 is provided with a pulley 52 which drives a belt 53 (FIGS. 4 and 7), said belt being wrapped about a pulley 54 which is connected to a support shaft 55 of an open ended conveyor auger 56. The belt passes under a tightener pulley 57 which has an adjustable connection as at 58 about its axis of rotation with a mounting bracket 59 said mounting bracket 59 being pivoted on a suitable bolt or pin assembly 60 about a substantially horizontal axis to the inner wall 50 of the trough. The bracket 59 is pivotally connected at 61 to the lower end of a first toggle link 62 which at its upper end is pivoted as at 63 to a second toggle link 64, the latter toggle link 64 being connected to a shaft 65 which is journalled to the inner wall 50. Shaft 50 is fixedly connected to or on integral part of an operating arm or handle 66 which swings under, around and over the top of the conveyor trough as best seen in FIG. 7 and is provided with an overhanging portion 68 which terminates in a handle 69 for grasping by the operator who is stationed at the opposite side of the machine. It will be realized that swinging the handle upwardly as shown in dotted lines in FIGURE 7, that is in a counterclockwise direction, releases the idler pulley 57 by positioning the linkage and the idler pulley as shown in dotted lines in FIGURE 7 and swinging the control arm 66 reestablishes the drive in the previous position by swinging the parts into the position shown in solid lines in FIGURE 7 whereby tightening the belt about the pulleys 52, 54 to establish drive to the auger 56.

It will be observed that the auger shaft 55 is supported at its free end in a bearing structure 70 which is carried by a wall support 71 connected across angular wall portions 72, 73 of an outer rear wall structure 74.

The outer rear wall structure 74 also forms the rear end of a hopper 75 which has a lateral edge portion 76 which in the position shown in FIGURE 2 extends in a fore and aft direction with respect to the operating tractor 30. The hopper 75 has a bottom downwardly inclined wall 77 which is perimetrically encompassed by the wall portion 73, 76 and a front wall portion 78 which is suitably connected with the rear wall 6 of the blower by a flange structure 79 which extends substantially normal to the wall 6 about the periphery of an inlet opening 80 in the rear side of the housing. The diagonal wall 77 merges with a concave bottom wall portion 85 (FIG. 6) which in turn merges with an upright rear wall 86 said walls 86 and 77 defining a downwardly converging V and the wall 85 being at the apex of the V and conforming substantially to the underside of the auger 56 which extends at substantially a 45° angle to the plane designated A—A (FIG. 4) of the blower rotor 40.

As before mentioned, the auger 56 is carried by the shaft 55 which in addition to the bearing mounting at 70 also has a bearing mounting at 88 from the inner wall 50 whereby the auger 56 which is an open ended auger and is cantilever supported is held securely from sagging against the bottom wall 85. It will be realized that the flights 89 of the auger 56 are arranged to provide for a downward sweep of material as it is being unloaded over lip 76 from the side conveyor 90 of the wagon 91 pulled up alongside the hopper 75. The conveyor 90 is part of a wagon 91 which is adapted to be pulled alongside the blower conveyor. The wagon 91 may have a hitch 92 which may be suitably connected to the draft drawbar 93 of an associated tractor 94.

It will be readily realized that the instant conveyor lends itself very readily to an efficient discharge operation from a wagon inasmuch as the auger 56 is oriented in the direction of flow of the material from the transverse conveyor 90 and the material is conveyed substantially in the direction of its flow into the blower inlet opening 80 which it will be appreciated is located in the lower righthand quadrant of the blower housing as seen in FIGURE 6. The acceleration of material as it is discharging into the blower is not diminished therefore it augments the action of the blower in discharging the material through the discharge chute 10.

Another important feature of the invention is in providing a novel baffle structure generally designated 95 (FIG. 6) which comprises a top wall 96 having an extension behind the wall 86 with a depending portion 97 for shielding the drives 48 and 46 and the clutch control mechanism 65. A portion 98 of the wall 96 extends over the auger 56 and at its edge adjacent to the inlet edge 76 of the trough is provided with a downwardly and outwardly sloping deflector wall portion 99 which overhangs the opening 80. This shroud structure channels the air which exits from the opening 80 in a swirling pattern as indicated by the arrows in FIGURE 6 training some of the material which works its way over the top of the auger and with a blast of air causes this material to reenter into the housing and to be carried into and to fluff material being carried by the paddles and to entrain that material also into an airstream which further augments the flow of the material through the discharge duct 10. It will be noted that the inlet opening has a curved bottom edge 82 slightly above the peripheral wall 7 as best seen in FIGURE 6, the edge conforming substantially to the contour of the bottom wall 85 of the trough and that the trough walls 86, 77 converge toward the housing and that the upper edge 100 (FIG. 6) of opening 80 is substantially horizontal. Thus the inlet opening 80 is wider at the top than at the bottom to allow the air to enter through the upper portion of opening 80 readily into the eye of the rotor over the material being discharged into the rotor by the auger whereby this air is then impelled by the blades radially outwardly into the material therebeneath and thereby moving it into the airstream. The shroud or helical swirl creating means has a portion 120 along the downstream edge 121 of opening 80 and the upstream edge 122 of opening 80 is open. The helical swirl of air and material is about an axis coaxial with the axis of the inlet opening 80. It will be realized that a novel blower is obtained having a high material handling efficiency. Also by providing a trough with a receiving area which extends longitudinally of the tractor as well as the forage wagon with which it is to be associated, the handling of the material and the flow of the material is optimized. The auger rotates in the direction of the arrow (FIG. 6) so that the material is swept downwardly into the inlet 80 and discharges in the direction of movement of the impeller into the blower housing. The axis x—x of the auger converges with the axis y—y of the impeller 40. Furthermore by providing the clutch control handle 66 so that it extends over the top of the conveyor housing toward the right side thereof as viewed in FIGURE 2, an operator standing in the operating space generally designated 102 (FIG. 2) has ready access to the handle 79 as well as to the controls 103 of the wagon 91 and also to the tractor controls. Furthermore, the arrangement is such that the receiving deck 76 is disposed outwardly of the right wheel 104 of the tractor 30 whereby the conveyor 90 is adapted to be readily positioned in vertically overlapped relation to the intake 76 without the necessity of jocking the forage box behind the wheel 104. It will be realized that the wall portion 98, 99 (FIGS. 2 and 6) are spaced laterally with respect to the wall portion or lip portion 76 whereby the upper part of the auger trough rightwardly of the wall portion or deflector wall 99 is open to provide a large inlet 105 into the trough.

The novel and effective and ingenuous arrangement has been obtained as described in the foregoing disclosure which promotes the flow of the material through the auger conveying system or the trough conveyor and through the blower. Abrupt changes of direction of movement of the material are eliminated and the inertia of the material as it is entering into the blower housing is utilized whereby the capacity of the rotor is increased without the necessity of excessively driving the rotor. Stated in other words the rate of flow of certain quantities of material per unit of time are increased and therefore for smaller volumes the power requirements are reduced.

What is claimed is:

1. In a material conveyor, a blower comprising a housing having a generally cylindrical peripheral wall with an outlet opening and upright axially spaced side walls, an impeller journalled between said side walls on a generally horizontal axis and having paddles sweeping along the peripheral wall, one of said side walls having an inlet opening therein below said axis spaced circumferentially of the blower from said outlet opening, and generally horizontally arranged conveyor means disposed at approximately a 45° angle to the plane of the impeller and converging with said plane in the direction of movement of the impeller and in direct feeding relation to the inlet opening, and said conveyor giving impetus to the material in the direction of movement of the impeller.

2. In a material conveying apparatus, a blower having a casing and an impeller rotatable therein on a generally horizontal axis, the casing having a generally tangential outlet and an axial inlet below said axis and generally horizontal conveyor means for delivering material directly to the blower through said axial inlet at an acute angle to the plane of the impeller in the direction toward the outlet, said conveyor means imparting an impetus to the material in the direction of movement of the impeller and augmenting the velocity of the material over that solely imparted by the impeller.

3. In a material conveying apparatus according to claim 2, a shroud overhanging said inlet and having a concave lower side and positioned in the stream of air incidentally exhausting from the inlet and providing a reentrant channel for said air into said inlet.

4. In a material conveying device, a blower having a substantially cylindrical housing with a generally tangential outlet opening and an axial inlet opening, an impeller rotatable within the housing on a generally horizontal axis and effective to carry the material from the inlet and discharge it through the outlet, said inlet located below said axis, a generally horizontally disposed conveyor extending diagonally to the axis of the housing from said inlet opening beyond the periphery of the housing and having a material receiver radially outwardly of the housing, said conveyor having a direct feeding trajectory diagonally disposed at an acute angle to the plane of rotation of the impeller and imparting an initial impetus to the material augmenting the movement of the material by the impeller.

5. In a material conveying apparatus a substantially cylindrical housing having a generally tangential outlet opening and an axial inlet opening displaced circumferentially with respect to the outlet opening, an impeller within the housing rotatable on a generally horizontal axis having a direction of rotation from the inlet opening to the outlet opening, a continuous generally straight generally horizontal conveyor comprising a conveyor trough connected to said housing and extending diagonally axially therefrom in a direction away from the outlet, an auger mounted in the trough and having its axis of rotation converging with the axis of rotation of the impeller in the direction toward the outlet opening, said inlet opening being located below said axis and said auger having direct delivery discharge into the inlet opening in a moving stream converging with the plane of the impeller toward said outlet.

6. The invention according to claim 5 and said inlet opening being offset approximately 90° from the outlet opening.

7. The invention according to claim 5 and said auger and impeller axes disposed substantially horizontally and said auger being rotated with its underportion advancing in the direction of movement of the adjacent portion of the impeller at said inlet opening.

8. In a material conveying apparatus, a generally cylindrical housing having a peripheral wall with a substantially tangential material outlet opening and having a pair of upright radial walls one of which has a material inlet opening, an impeller journalled between said radial walls on a generally horizontal axis, a generally horizontal trough extending lengthwise diagonally to said axis and having one end communicating with the inlet opening, said inlet opening being on the side of said axis remote from said outlet, said trough having an inlet area displaced transaxially of the housing and a single conveying means extending from said inlet area of the trough to said inlet opening in the housing, and said conveying means having a direct delivery of material into the inlet opening in a moving stream acutely converging with the axis of the impeller toward the discharge opening.

9. In a material conveying device, a generally cylindrical blower having a peripheral wall with a material outlet opening and a pair of upright side walls, one of the side walls having a material inlet opening in the lower portion thereof and a conveyor for delivering material to the blower comprising a U-shaped trough having one end connected to said one side wall in alignment with said inlet opening therein, said trough extending lengthwise diagonally away from said one side wall beyond the peripheral wall, an auger mounted for rotation within the trough on a generally horizontal axis at an acute angle to said one side wall and extending to said inlet opening and directly delivering material into the inlet opening in a direction toward the outlet opening, and an impeller in the housing rotatable on a generally horizontal axis for engaging the material entered therein and augmenting said movement of the material, the axis of the auger converging with the impeller in the direction of rotation thereof.

10. The invention according to claim 9 and said auger having flights, and means for rotating the auger in a direction such that its lower edge moves in the direction of movement of the impeller at said inlet opening.

11. In a material conveying device, a generally cylindrical blower having a peripheral wall with a material outlet opening and a pair of upright side walls, one of the side walls having a material inlet opening and a conveyor for delivering material to the blower comprising a U-shaped trough having one end connected to said one side wall in alignment with said inlet opening therein, said trough extending lengthwise diagonally away from said one side wall beyond the peripheral wall, an auger mounted for rotation within the trough on a generally horizontal axis at an acute angle to said one side wall for delivering material into the inlet opening in a direction toward the outlet opening, and an impeller in the housing for engaging the material entered therein and augmenting said movement of the material the axis of the auger converging with the impeller in the direction of rotation thereof, and said auger having flights, and means for rotating the auger in a direction such that its lower edge means moves in the direction of movement of the impeller at said inlet opening, and a deflector extending over a portion of the trough adjacent to the housing immediately over the inlet opening therein and having a generally horizontal portion extending along the upper edge of said inlet opening and having a diagonal downwardly extending portion.

12. In a material conveyor, blower means comprising a housing having a pair of upright axially spaced walls and an intervening circumferential wall, an impeller having a generally horizontal shaft journalled through said side walls, said circumferential wall having an upwardly directed outlet opening, one of said side walls having a horizontally directed inlet opening disposed below the said shaft, an impeller mounted on the shaft and driven thereby, a material conveyor having a trough with an inner end connected to said one side wall, said trough being elongated in a direction diagonally away from said outlet and having an outer end displaced radially of the housing farther from the outlet than said inner end, said trough having sides diverging in horizontal planes away from the housing and having a top wall portion overhanging one side of the trough and providing with the opposite side of the trough an upwardly open material inlet opening, said top wall portion extending to said inlet opening in said one side wall and having a baffle means flapped over the inlet opening for directing air and material in a swirl pattern into said inlet opening.

13. In a material conveying apparatus, a blower comprising a housing having a generally tangential outlet and an axial inlet, impeller means in the housing aperture to direct air and material through the housing from the inlet to the outlet and for blowing incidental air through the inlet where material is being directed therewith by impingement against said material, auger conveying means extending diagonally toward said inlet, and shroud means encompassing the inlet and having guide portions extending axially of the blower and across the auger and providing a surface athwart the path of incidental air blasts and providing a reentrant surface directed toward the inlet opening on a side thereof opposite the area athwart the air blast for redirecting such air with entrained material into the inlet opening.

14. In a material conveyor, a housing having a pair of upright side walls, one of which has an axial inlet opening and a peripheral wall with an outlet opening, an impeller mounted within the housing and having a generally horizontal drive shaft journalled through said side walls, a material receiver connected to said one side wall and extending generally diagonally from the blower housing beyond one side thereof, said receiver having an auger trough bottom, said receiver having a material receiving area and an auger extending diagonally crosswise of said area to the inlet opening in the housing and having a delivery path for material diagonal to the impeller in converging relationship thereto in the direction of rotation of the impeller, means for driving the auger comprising shafting connected to the impeller shaft, and extending toward the end of the auger trough remote from the blower housing, shaft means mounting said auger from said last mentioned end of the trough and a driving train connecting said shaft means with said shafting.

References Cited by the Examiner

UNITED STATES PATENTS

| | | | |
|---|---|---|---|
| 1,423,221 | 7/1922 | Jeffers | 302—37 |
| 2,405,695 | 8/1946 | Hitchcock et al. | 302—37 |
| 2,410,501 | 11/1946 | Huddle | 302—37 |
| 2,482,723 | 9/1949 | Wallace | 306—37 |
| 2,955,403 | 10/1960 | McKee | 302—37 |
| 3,145,063 | 8/1964 | Kools | 302—37 |
| 3,154,349 | 10/1964 | Wallin et al. | 302—37 |
| 3,175,867 | 3/1965 | Fenster et al. | 302—37 |

ANDRES H. NIELSEN, *Primary Examiner.*